(12) United States Patent
Hsu et al.

(10) Patent No.: US 9,930,735 B1
(45) Date of Patent: Mar. 27, 2018

(54) LOW-FLICKER LIGHT-EMITTING DIODE LIGHTING DEVICE

(71) Applicant: IML International, Grand Cayman (KY)

(72) Inventors: Horng-Bin Hsu, Taipei (TW); Yi-Mei Li, New Taipei (TW); Yung-Hsin Chiang, New Taipei (TW)

(73) Assignee: IML International, Grand Cayman (KY)

( * ) Notice: Subject to any disclaimer, the term of this patent is extended or adjusted under 35 U.S.C. 154(b) by 0 days.

(21) Appl. No.: 15/682,555

(22) Filed: Aug. 22, 2017

(51) Int. Cl.
*H05B 33/08* (2006.01)
*H05B 37/02* (2006.01)
*G05F 5/00* (2006.01)

(52) U.S. Cl.
CPC ..... *H05B 33/0812* (2013.01); *H05B 33/0824* (2013.01); *H05B 33/0842* (2013.01); *H05B 37/02* (2013.01); *G05F 5/00* (2013.01)

(58) Field of Classification Search
CPC .... H05B 41/34; H05B 33/0803; H05B 39/09; H05B 41/28; H05B 33/0809; H05B 33/0815; H05B 33/0818; H05B 41/2828; H05B 41/3921; H05B 41/3927; H05B 37/029; H05B 37/0254; H05B 37/02
See application file for complete search history.

(56) References Cited

U.S. PATENT DOCUMENTS

2011/0266962 A1* 11/2011 Son ..................... H05B 33/0815
315/185 R
2017/0257920 A1* 9/2017 Liu ..................... H05B 33/0827

* cited by examiner

*Primary Examiner* — Minh D A
(74) *Attorney, Agent, or Firm* — Winston Hsu

(57) ABSTRACT

An LED lighting device driven by a rectified AC voltage includes a luminescent device, a charge storage unit and a current controller. The charge storage unit is configured to turn on the luminescent device when the rectified AC voltage is still insufficient to turn on the luminescent device. The current control unit is configured to allow the LED lighting device to have constant luminance regardless of the level of the rectified AC voltage or dimmer condition, thereby improving flicker phenomenon.

24 Claims, 8 Drawing Sheets

LOW-FLICKER LIGHT-EMITTING DIODE LIGHTING DEVICE

BACKGROUND OF THE INVENTION

1. Field of the Invention

The present invention is related to an LED lighting device, and more particularly, to a low-flicker LED lighting device.

2. Description of the Prior Art

A light-emitting diode (LED) lighting device directly driven by a rectified alternative-current (AC) voltage usually adopts a plurality of LEDs coupled in series in order to provide required luminance. An LED lighting device is configured to modulate luminous flux and intensity. This time variation is commonly referred to as flicker. LED flicker, whether perceptible or not, has been a concern of the lighting community because of its potential human impacts, which range from distraction, mild annoyance to neurological problems. Therefore, there is a need for an LED lighting device capable of improving the flicker phenomenon.

SUMMARY OF THE INVENTION

The present invention provides an LED lighting device which includes a luminescent device, a current control unit, and a charge storage unit. The luminescent device, configured to provide light according to first current, includes a first end coupled to receive a rectified AC voltage, and a second end. The current control unit includes a first current regulator having a first pin coupled to the second end of the luminescent device and a second pin, and configured to regulate the first current so that the first current does not exceed a first current setting, and adjust a value of the first setting according to a voltage of the first pin. The second current regulator includes a first end coupled to the second pin of the first current regulator. The second current regulator is configured to regulate second current so that the second current does not exceed a second current setting, wherein the second current is an overall current of the LED lighting device. The charge storage unit includes a first end coupled to the first end of the luminescent device and a second end coupled to the second pin of the first current regulator. The charge storage unit is configured to supply the first current when the rectified AC voltage is smaller than a first voltage established across the charge storage unit, thereby keeping the luminescent device turned on.

The present invention also provides an LED device which includes a luminescent device, a current control unit, and a charge storage unit. The luminescent device includes a first end and a second end, and configured to provide light according to first current. The current control unit includes a first current regulator and a second current regulator. The first current regulator includes a first pin coupled to receive a rectified AC voltage and a second pin coupled to the first end of the luminescent device. The first current regulator is configured to regulate the first current so that the first current does not exceed a first current setting and adjust a value of the first setting according to a voltage of the first pin. The second current regulator includes a first end coupled to the second end of the luminescent device and configured to regulate second current so that the second current does not exceed a second current setting, wherein the second current is an overall current of the LED lighting device. The charge storage unit includes a first end coupled to the first pin of the first current regulator and a second end coupled to the second end of the luminescent device, and configured to supply the first current when the rectified AC voltage is smaller than a first voltage established across the charge storage unit, thereby keeping the luminescent device turned on.

These and other objectives of the present invention will no doubt become obvious to those of ordinary skill in the art after reading the following detailed description of the preferred embodiment that is illustrated in the various figures and drawings.

DETAILED DESCRIPTION

FIGS. 1~6 are diagrams of LED lighting devices 101~106 according to embodiments of the present invention. Each of the LED lighting devices 101~106 includes a power supply circuit 110, a luminescent device 10, a current control unit 20, and a charge storage unit C1.

The power supply circuit 110 is configured to receive an AC voltage VS having positive and negative periods and convert the output of the AC voltage VS in the negative period using a bridge rectifier 112, thereby providing a rectified AC voltage $V_{AC}$, whose value varies periodically with time, for driving the LED lighting devices 101~106. N1 represents the positive output end of the power supply circuit 110, while N2 represents the negative output end of the power supply circuit 110. In another embodiment, the power supply circuit 110 may receive any AC voltage VS, perform voltage conversion using an AC-AC converter, and rectify the converted AC voltage VS using the bridge rectifier 112, thereby providing the rectified AC voltage $V_{AC}$ whose value varies periodically with time. However, the configuration of the power supply circuit 110 does not limit the scope of the present invention.

In the LED lighting devices 101~106, each of the luminescent device 10 may adopt a single LED or multiple LEDs coupled in series. FIGS. 1~6 depict the embodiment using multiple LEDs which may consist of single-junction LEDs, multi-junction high-voltage (HV) LEDs, or any combination of various types of LEDs. However, the types and configurations of the luminescent device 10 do not limit the scope of the present invention.

In the LED lighting devices 101~106, the charge storage unit C1 may adopt a capacitor, or one or multiple devices which provides similar function. However, the type and configuration of the charge storage unit C1 do not limit the scope of the present invention.

For illustrative purposes, the following symbols are used to explain the operation of the LED lighting devices 101~106 throughout the description and figures. $V_{C1}$ represents the voltage established across the charge storage unit C1. $I_{C1}$ represents the current flowing through the charge storage unit C1. $V_{LED}$ represents the voltage established across the luminescent device 10. $I_{LED}$ represents the current flowing through the luminescent device 10. $I_{IN}$ represents the overall current flowing through the LED lighting devices 101~106.

Figure 1:
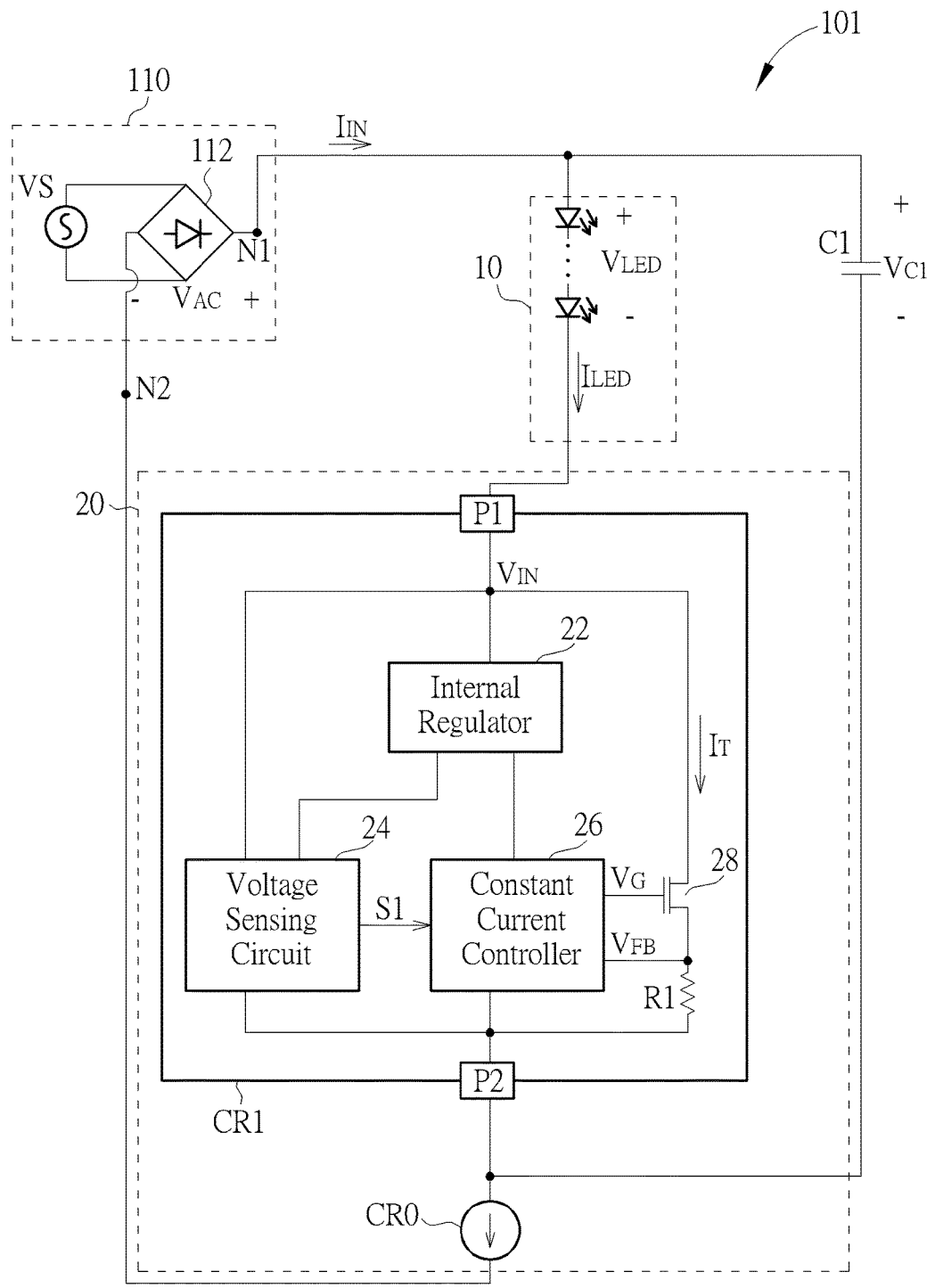
FIG. 1 is a diagram of an LED lighting device according to an embodiment of the present invention.

In the LED lighting device 101 depicted in FIG. 1, the current control unit 20 includes two current regulators CR0 and CR1 coupled in series. The current regulator unit CR1 with a current setting $I_{SET}$ is coupled in series to the luminescent device 10, wherein the charge storage unit C1 is coupled in parallel with the serially-coupled current regulator CR1 and the luminescent device 10. The current regulator CR0 with a current setting $I_{SET0}$ is coupled in series to the charge storage unit C1 and between the current regulator CR1 and the negative output end N2 of the power supply circuit 110. The current regulator CR1 includes an internal regulator 22, a voltage sensing circuit 24, a constant current controller 26, a transistor 28, and a current sensing element R1. The current regulator CR1 may be fabricated in the same chip as a two-pin device, wherein Pin P1 is an input pin which is coupled to the luminescent device 10, and Pin P2 is a ground pin which is coupled to the current regulator CR0.

Figure 2:
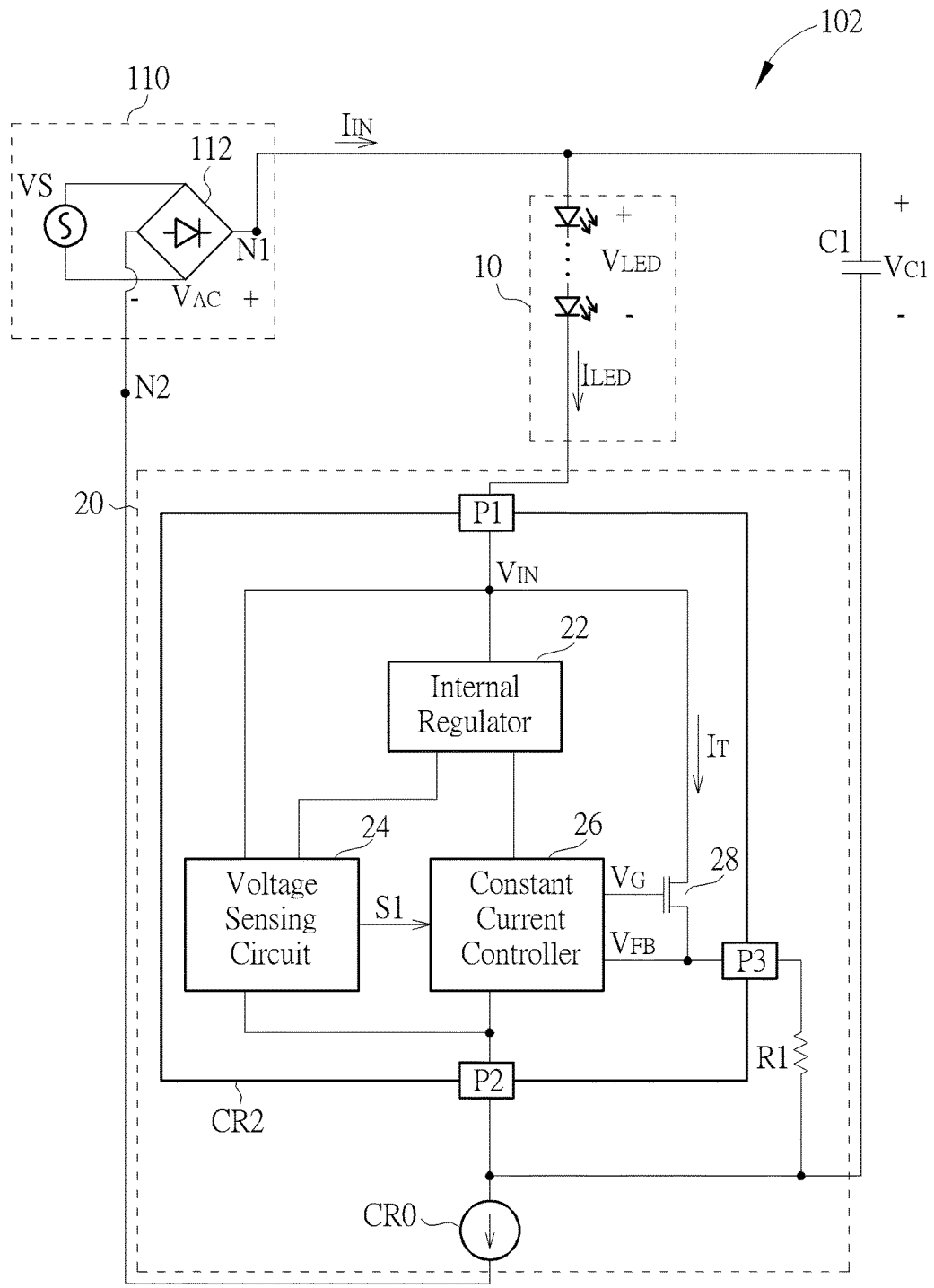
FIG. 2 is a diagram of an LED lighting device according to another embodiment of the present invention.

In the LED lighting device 102 depicted in FIG. 2, the current control unit 20 includes two current regulators CR0 and CR2 coupled in series, as well as a current sensing element R1. The current regulator CR2 with a current setting $I_{SET}$ is coupled in series to the luminescent device 10, wherein the charge storage unit C1 is coupled in parallel with the serially-coupled current regulator CR2 and the luminescent device 10. The current regulator CR0 with a current setting $I_{SET0}$ is coupled in series to the charge storage unit C1 and between the current regulator CR2 and the negative output end N2 of the power supply circuit 110. The current regulator CR2 includes an internal regulator 22, a voltage sensing circuit 24, a constant current controller 26, and a transistor 28. The current regulator CR2 may be fabricated in the same chip as a three-pin device, wherein Pin P1 is an input pin which is coupled to the luminescent device 10, Pin P2 is a ground pin which is coupled to the current regulator CR0, and Pin P3 is a control pin. The current sensing element R1 is coupled between Pin P2 and Pin P3.

Figure 3:
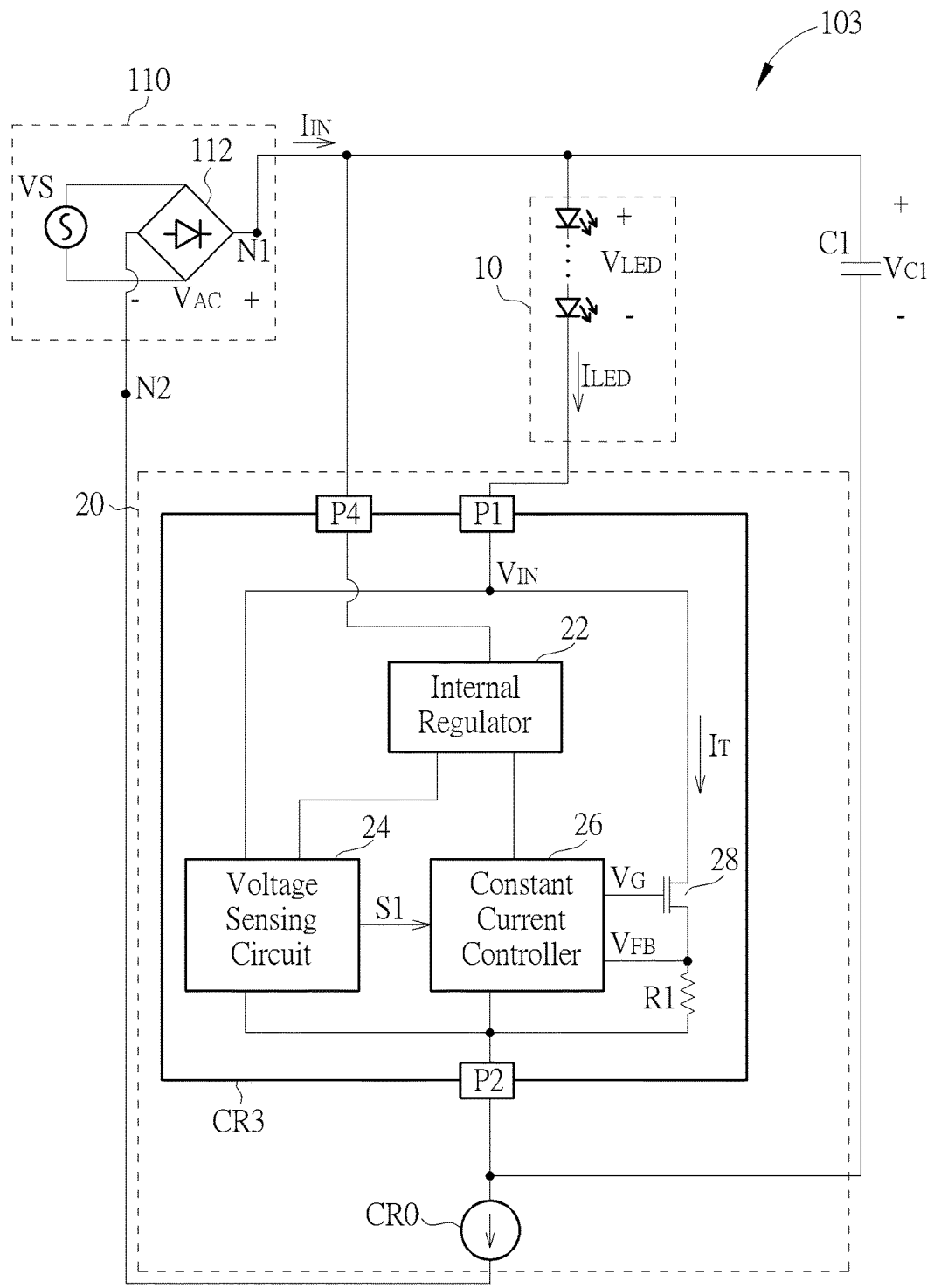
FIG. 3 is a diagram of an LED lighting device according to another embodiment of the present invention.

In the LED lighting device 103 depicted in FIG. 3, the current control unit 20 includes two current regulators CR0 and CR3 coupled in series. The current regulator unit CR3 with a current setting $I_{SET}$ is coupled in series to the luminescent device 10, wherein the charge storage unit C1 is coupled in parallel with the serially-coupled current regulator CR3 and the luminescent device 10. The current regulator CR0 with a current setting $I_{SET0}$ is coupled in series to the charge storage unit C1 and between the current regulator CR1 and the negative output end N2 of the power supply circuit 110. The current regulator CR3 includes an internal regulator 22, a voltage sensing circuit 24, a constant current controller 26, a transistor 28, and a current sensing element R1. The current regulator CR3 may be fabricated in the same chip as a three-pin device, wherein Pin P1 is an input pin which is coupled to the luminescent device 10, Pin P2 is a ground pin which is coupled to the current regulator CR0, and Pin P4 is a power pin which is coupled to the positive output end N1 of the power supply circuit 110.

Figure 4:
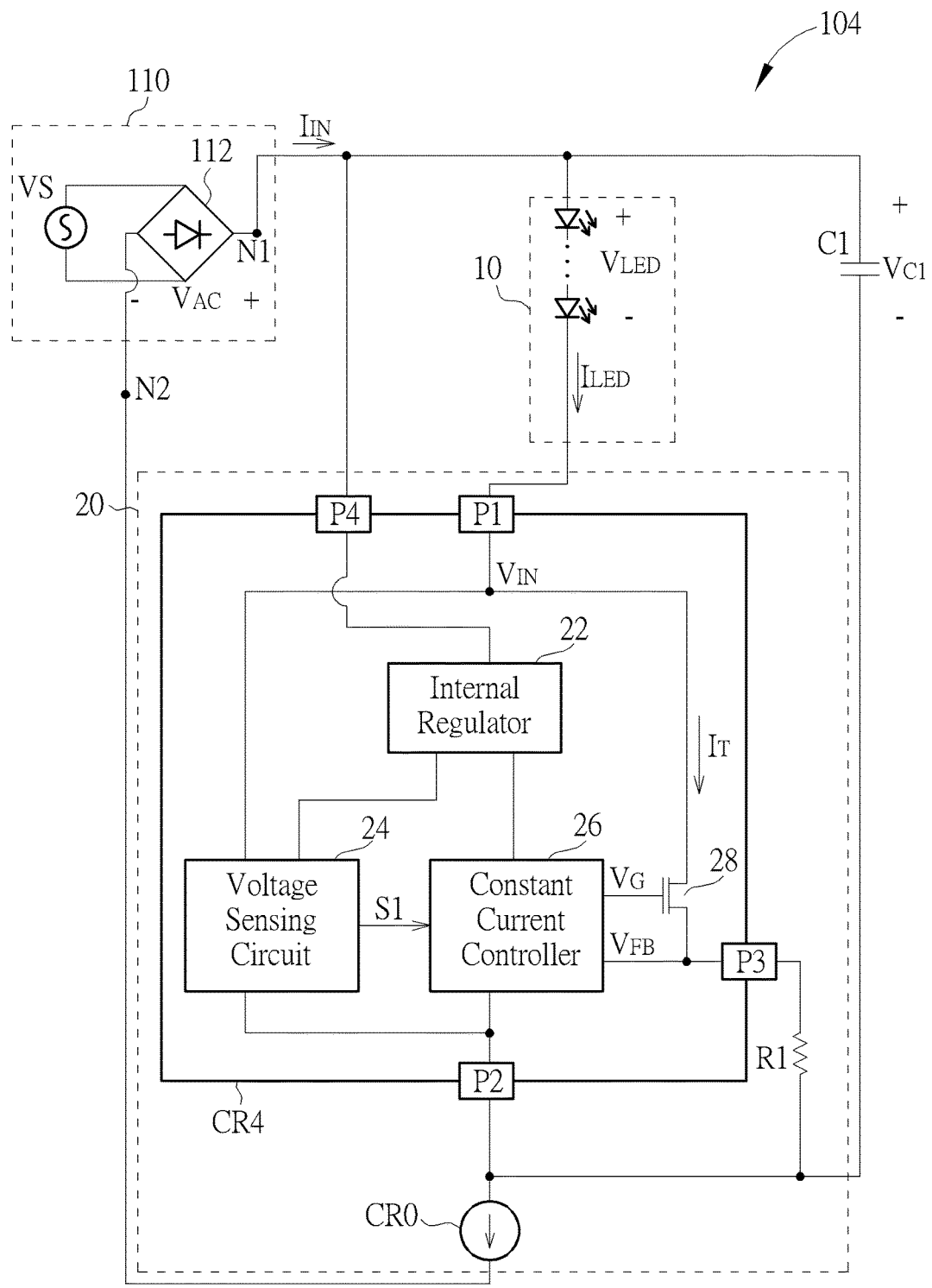
FIG. 4 is a diagram of an LED lighting device according to another embodiment of the present invention.

In the LED lighting device 104 depicted in FIG. 4, the current control unit 20 includes two current regulators CR0 and CR4 coupled in series, as well as a current sensing element R1. The current regulator CR4 with a current setting $I_{SET}$ is coupled in series to the luminescent device 10, wherein the charge storage unit C1 is coupled in parallel with the serially-coupled current regulator CR4 and the luminescent device 10. The current regulator CR0 with a current setting $I_{SET0}$ is coupled in series to the charge storage unit C4 and between the current regulator CR4 and the negative output end N2 of the power supply circuit 110. The current regulator CR4 includes an internal regulator 22, a voltage sensing circuit 24, a constant current controller 26, and a transistor 28. The current regulator CR4 may be fabricated in the same chip as a four-pin device, wherein Pin P1 is an input pin which is coupled to the luminescent device 10, Pin P2 is a ground pin which is coupled to the current regulator CR0, Pin P3 is a control pin, and Pin P4 is a power pin which is coupled to the positive output end N1 of the power supply circuit 110.

Figure 5:
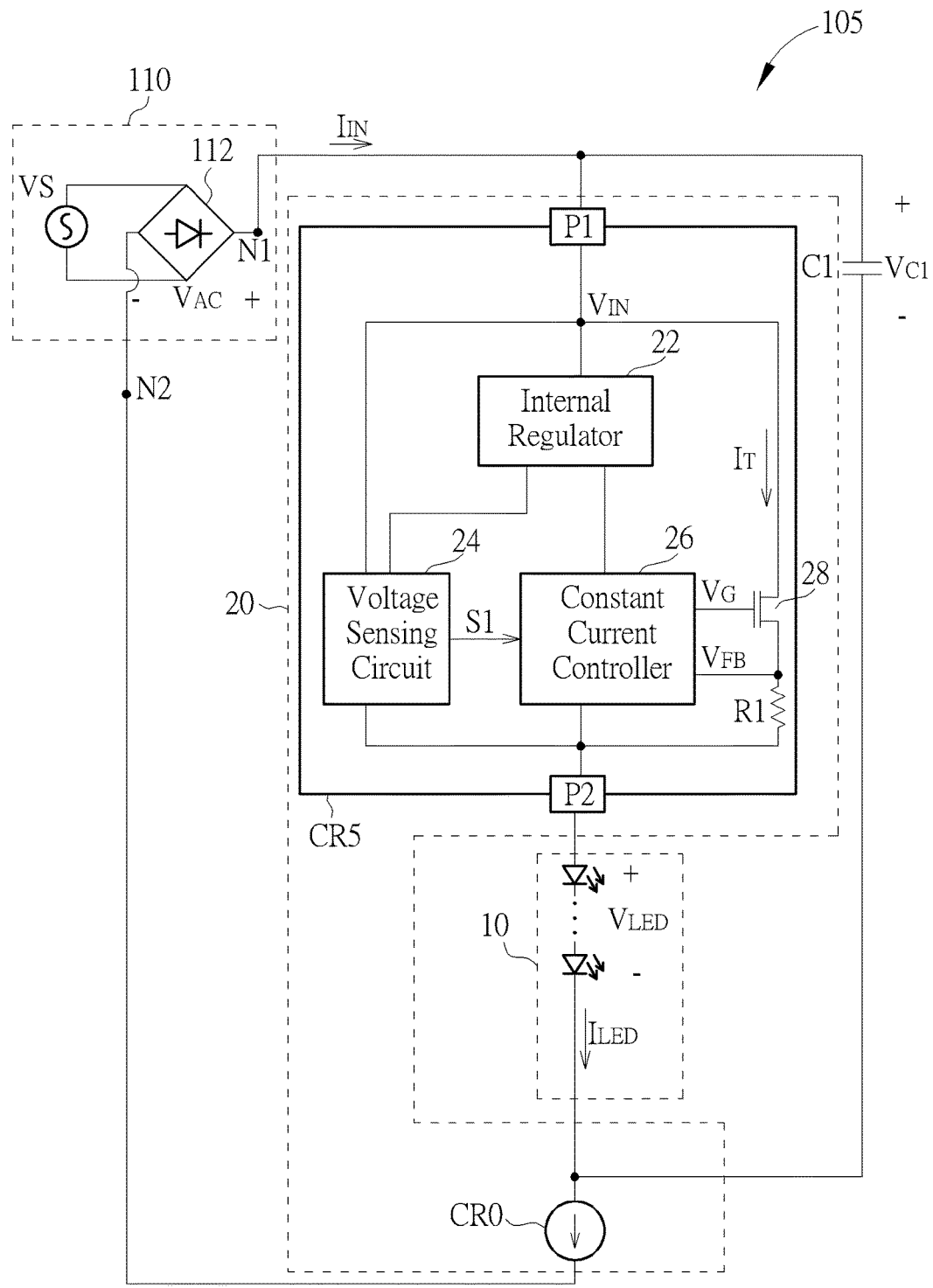
FIG. 5 is a diagram of an LED lighting device according to another embodiment of the present invention.

In the LED lighting device 105 depicted in FIG. 5, the current control unit 20 includes two current regulators CR0 and CR5. The current regulator unit CR5 with a current setting $I_{SET}$ is coupled in series to the luminescent device 10, wherein the charge storage unit C1 is coupled in parallel with the serially-coupled current regulator CR5 and the luminescent device 10. The current regulator CR0 with a current setting $I_{SET0}$ is coupled in series to the charge storage unit C1 and between the luminescent device 10 and the negative output end N2 of the power supply circuit 110. The current regulator CR5 includes an internal regulator 22, a voltage sensing circuit 24, a constant current controller 26, a transistor 28, and a current sensing element R1. The current regulator CR5 may be fabricated in the same chip as a two-pin device, wherein Pin P1 is an input pin which is coupled to the positive output end N1 of the power supply circuit 110, and Pin P2 is a ground pin which is coupled to the luminescent device 10.

Figure 6:
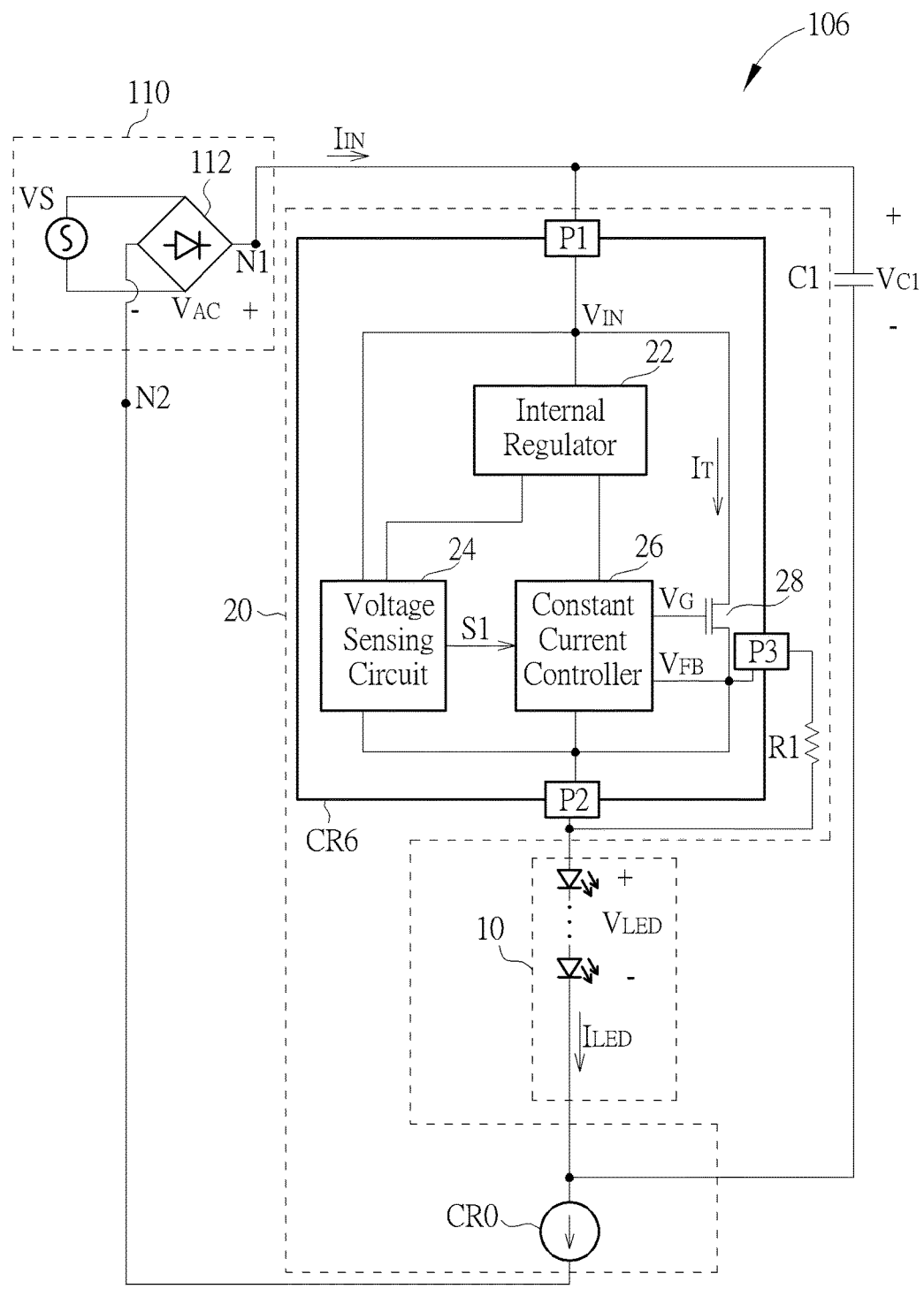
FIG. 6 is a diagram of an LED lighting device according to another embodiment of the present invention.

In the LED lighting device 106 depicted in FIG. 6, the current control unit 20 includes two current regulators CR0 and CR6 coupled in series, as well as a current sensing element R1. The current regulator CR6 with a current setting $I_{SET}$ is coupled in series to the luminescent device 10, wherein the charge storage unit C1 is coupled in parallel with the serially-coupled current regulator CR6 and the luminescent device 10. The current regulator CR0 with a current setting $I_{SET0}$ is coupled in series to the charge storage unit C1 and between the luminescent device 10 and the negative output end N2 of the power supply circuit 110. The current regulator CR6 includes an internal regulator 22, a voltage sensing circuit 24, a constant current controller 26, and a transistor 28. The current regulator CR6 may be fabricated in the same chip as a three-pin device, wherein Pin P1 is an input pin which is coupled to the positive output end N1 of the power supply circuit 110, Pin P2 is a ground pin which is coupled to the luminescent device 10, and Pin P3 is a control pin. The current sensing element R1 is coupled between Pin P2 and Pin P3.

In the LED lighting devices 101, 102, 105 and 106 the internal regulator 22 is configured to generate power for at least one of the voltage sensing circuit 24 and the constant current controller 26 from Pin P1. In the LED lighting devices 103 and 104, the internal regulator 22 is configured to generate power for at least one of the voltage sensing circuit 24 and the constant current controller 26 from Pin P4.

In the LED lighting devices 101, 103 and 105, the current sensing element R1 is configured to sense the level of the regulating current $I_T$, thereby providing a corresponding feedback voltage $V_{FB}$ to the constant current controller 26. In the LED lighting devices 102, 104 and 106, the current sensing element R1 is configured to establish a voltage at Pin P3 according to the regulating current $I_T$, so that a corresponding feedback voltage $V_{FB}$ may be provided to the constant current controller 26.

In the LED lighting devices 101-106, the transistor 28 is configured to generate constant regulating current $I_T$ for the luminescent device 10 according to a control voltage $V_G$. The voltage sensing circuit 24 is configured to detect the level of a voltage $V_{IN}$ established at Pin P1, thereby outputting a corresponding control signal S1. If the voltage $V_{IN}$ is lower than the dropout voltage of the corresponding current regulator, it means that the charge energy provided by the rectified voltage $V_{AC}$ is insufficient to keep the current $I_{LED}$ at the constant level. Under such circumstance, the voltage sensing circuit 24 is configured to generate the control signal S1 to the constant current controller 26 so that the constant current controller 26 can adjust the control voltage $V_G$ in order to reduce the regulating current $I_T$. If the voltage $V_{IN}$ is higher than a predetermined voltage of the corresponding current regulator, it means that the charge energy provided by the rectified voltage $V_{AC}$ is too much for the current $I_{LED}$ so that there is too much energy wasted on the current regulator CR1~CR6. Under such circumstance, the voltage sensing circuit 24 is configured to generate the control signal S1 to the constant current controller 26 so that the constant current controller 26 can adjust the control voltage $V_G$ in order to increase the regulating current $I_{T1}$.

In the embodiment depicted in FIGS. 1-6, the transistor 28 is a metal-oxide-semiconductor field-effect transistor (MOSFET). In another embodiment, the transistor 28 may adopt a bipolar junction transistor (BJT) or another device with similar function. However, the type of the transistor 28 does not limit the scope of the present invention.

Figure 7:
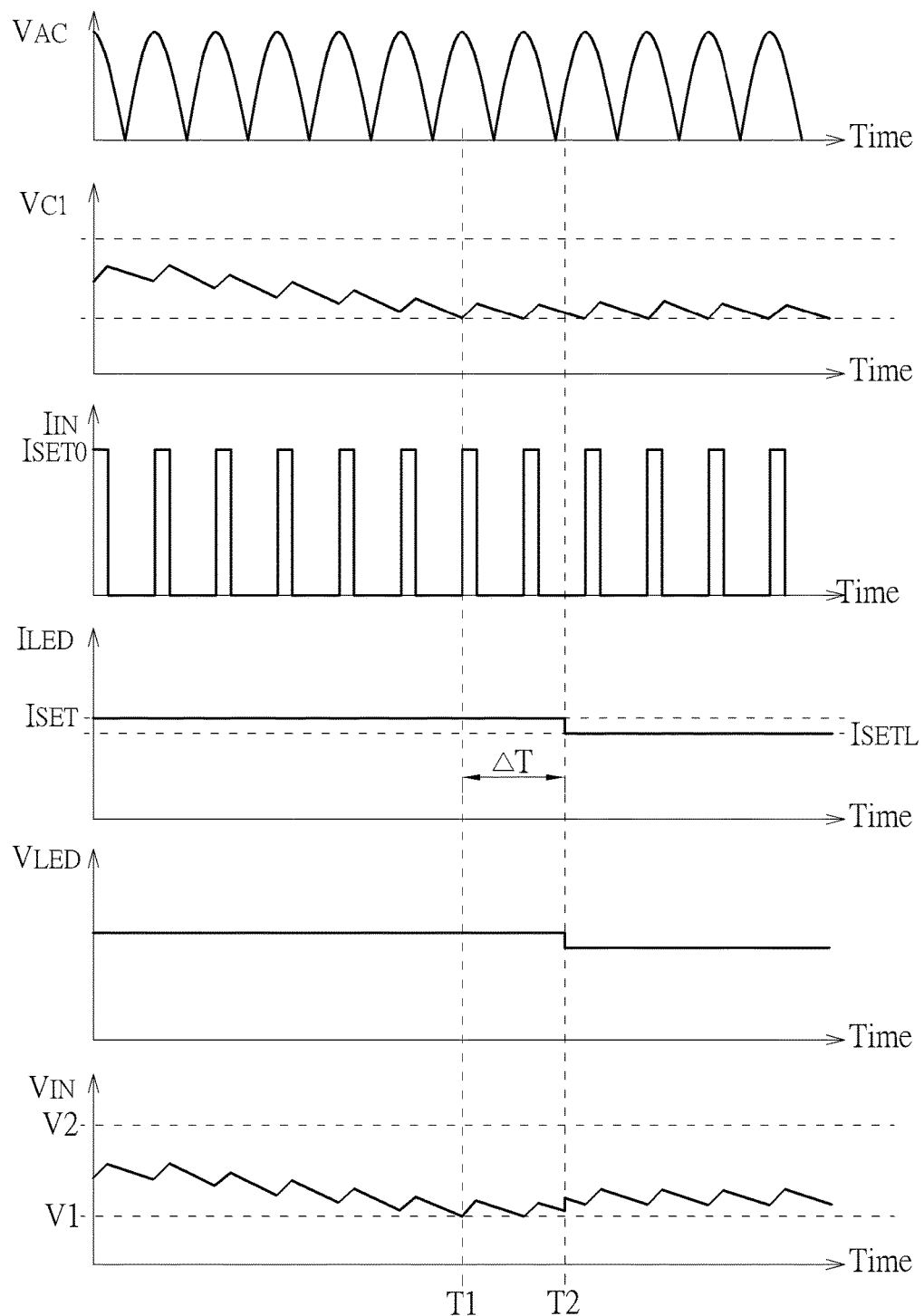
FIG. 7 is a diagram illustrating the current/voltage characteristics of an LED lighting device according to the present invention.
Figure 8:
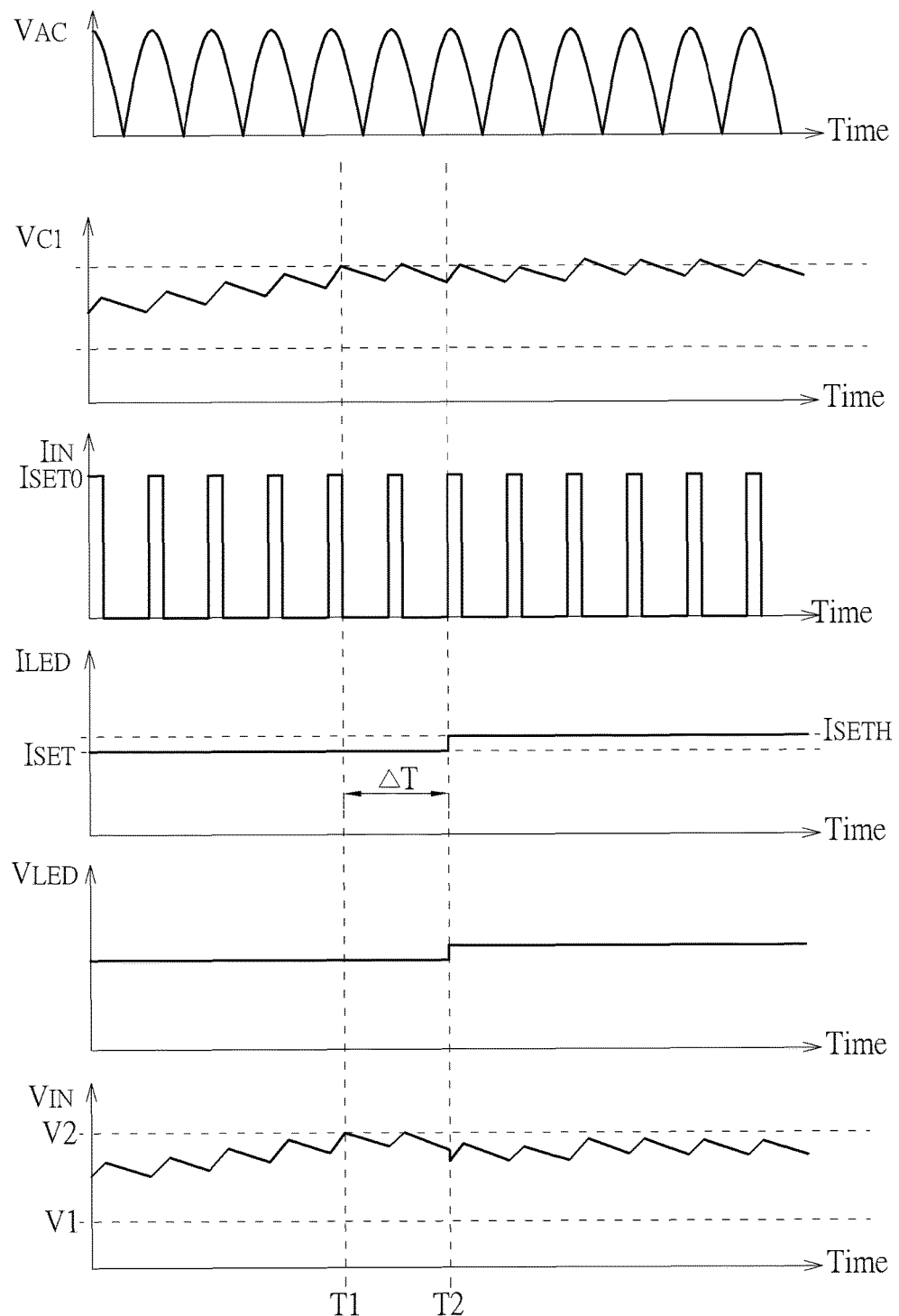
FIG. 8 is a diagram illustrating the current/voltage characteristics of an LED lighting device according to the present invention.

FIGS. 7 and 8 are diagrams illustrating the current/voltage characteristics of the LED lighting devices 101-106 according to the present invention. During the rising period or the falling period of the rectified AC voltage $V_{AC}$ when the voltage $V_{AC}$ is larger than the sum of the cut-in voltages of the luminescent device 10 and the current control unit 20, the voltage $V_{LED}$ is sufficiently large to turn on the luminescent device 10, and both current regulators in the current control unit 20 are in function. More specifically, the luminescent device 10 may be maintained in ON state by the rectified AC voltage $V_{AC}$. The current regulators CR1-CR6 are configured to clamp the current $I_{LED}$ at $I_{SET}$. The current regulator CR0 is configured to clamp the current $I_{IN}$ at $I_{SET0}$. During these periods, the rectified AC voltage $V_{AC}$ is also charging the charge storage unit C1 in the LED lighting devices 101-106 by an amount of ($I_{SET0}$–$I_{SET}$) and the voltage $V_{C1}$ thus gradually increases.

During the rising period or the falling period of the rectified AC voltage $V_{AC}$ when the voltage $V_{AC}$ is smaller than the sum of the cut-in voltages of the luminescent device 10 and the current control unit 20, the voltage $V_{LED}$, further supplied by the charge storage unit C1, is still sufficient to turn on the luminescent device 10. Under such circumstance, the current regulators CR1-CR6 is in function, but the current regulator CR0 is not in function. More specifically, the current $I_{LED}$ is supplied by the energy discharged from the charge storage unit C1, thereby maintaining the luminescent device 10 in ON state. The current regulators CR1-CR6 are configured to clamp the current $I_{LED}$ at $I_{SET}$, and the current regulator CR0 is not regulating any current ($I_{IN}$=0). During these periods, the charge storage unit C1 is discharging through the luminescent device 10, and the voltage $V_{C1}$ thus gradually decreases.

As depicted in FIGS. 7 and 8, the introduction of the charge storage unit C1 allows the luminescent device 10 to have long turn-on time or to be consistently turned on. The introduction of the current control unit 20 allows the LED lighting devices 101-106 to have constant luminance regardless of the level of the rectified AC voltage $V_{AC}$, thereby improving the flicker phenomenon.

However, if the driving conditions of the LED lighting devices 101-106 change, the flicker performance may be influenced. For example, the LED lighting devices 101-106 may each be attached to a phase-cut dimmer and dimmed to different levels, the charging energy may increase or decrease to a level that it is no longer possible for the LED current to maintain at its constant level, and the percent flicker will increase accordingly.

In the embodiment depicted in FIG. 7, the LED lighting devices 101-106 each attached to a phase-cut dimmer may be dimmed to a lower level at T1. When the voltage sensing circuit 24 detects that the voltage $V_{IN}$ at Pin P1 drops to a lower limit V1 at T1, it instructs the constant current controller 26 to lower the control voltage $V_G$ in order to reduce the regulating current $I_T$. Therefore, the current $I_{LED}$ may also drop to a reduced value $T_{SETL}$ after T2. A delay time $\Delta T$ of (T2–T1) is required for the constant current controller 26 to change the regulating current to avoid flickering, and can be realized by a deglitch circuit, an RC delay circuit, or a counter.

In the embodiment depicted in FIG. 8, the LED lighting devices 101-106 each attached to a phase-cut dimmer may be dimmed to a higher level at T1. When the voltage sensing circuit 24 detects that the voltage $V_{IN}$ at Pin P1 reaches an upper limit V2 at T1, it instructs the constant current controller 26 to raise the control voltage $V_G$ in order to increase the regulating current $I_T$. Therefore, the current $I_{LED}$ may also reach an increased value $T_{SETH}$ after T2. A delay time $\Delta T$ of (T2–T1) is required for the constant current controller 26 to change the regulating current to avoid flickering, and can be realized by a deglitch circuit, an RC delay circuit, or a counter.

With the above-mentioned charge storage units and current control units, luminous variation is negligible in the LED lighting device according to the present invention. Therefore, the present invention can provide an LED lighting device capable of improving the flicker phenomenon.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A light-emitting diode (LED) lighting device, comprising:
    a luminescent device configured to provide light according to first current, and comprising:
        a first end coupled to receive a rectified alternative-current (AC) voltage; and
        a second end;

a current control unit comprising:
  a first current regulator having a first pin coupled to the second end of the luminescent device and a second pin, and configured to:
    regulate the first current so that the first current does not exceed a first current setting; and
    adjust a value of the first setting according to a voltage of the first pin; and
  a second current regulator having a first end coupled to the second pin of the first current regulator and configured to regulate second current so that the second current does not exceed a second current setting, wherein the second current is an overall current of the LED lighting device; and
a charge storage unit having a first end coupled to the first end of the luminescent device and a second end coupled to the second pin of the first current regulator, and configured to supply the first current when the rectified AC voltage is smaller than a first voltage established across the charge storage unit, thereby keeping the luminescent device turned on.

2. The LED lighting device of claim 1, wherein the first current regulator includes:
  a transistor configured to generate regulating current associated with the first current setting for the luminescent device according to a first control signal;
  a current sensing element configured to sense a level of the regulating current, thereby providing a corresponding feedback voltage;
  a voltage sensing circuit coupled to the first pin of the first current regulator and configured to detect the voltage of the first pin, thereby outputting a corresponding second control signal; and
  a constant current controller configured to adjust a level of the first control signal according to the second control signal and the feedback voltage.

3. The LED lighting device of claim 2, wherein the transistor is configured to increase the regulating current when the voltage of the first pin exceeds a first level and reduce the regulating current when the voltage of the first pin drops below a second level lower than the first level.

4. The LED lighting device of claim 2, wherein the transistor is configured to reduce the regulating current when the feedback voltage exceeds a first value and increase the regulating current when the feedback voltage drops below a second value smaller than the first value.

5. The LED lighting device of claim 2, further comprising:
  an internal regulator configured to generate power for at least one of the voltage sensing circuit and the constant current controller from the first pin.

6. The LED lighting device of claim 2, further comprising:
  a power supply circuit for providing the rectified AC voltage; and
  an internal regulator coupled to a third pin of the first current regulator and configured to generate power for at least one of the voltage sensing circuit and the constant current controller from the third pin, wherein the third pin is coupled to the power supply circuit.

7. The LED lighting device of claim 1, further comprising:
  a current sensing element coupled between the second pin and a third pin of the first current regulator, and configured to sense a level of regulating current associated with the first current setting, thereby providing a corresponding feedback voltage.

8. The LED lighting device of claim 7, wherein the first current regulator includes:
  a transistor configured to generate the regulating current for the luminescent device according to a first control signal;
  a voltage sensing circuit coupled to the first pin and configured to detect the voltage of the first pin, thereby outputting a corresponding second control signal; and
  a constant current controller configured to adjust a level of the first control signal according to the second control signal and the feedback voltage.

9. The LED lighting device of claim 8, wherein the transistor is configured to increase the regulating current when the voltage of the first pin exceeds a first level and reduce the regulating current when the voltage of the first pin drops below a second level lower than the first level.

10. The LED lighting device of claim 8, wherein the transistor is configured to reduce the regulating current when the feedback voltage exceeds a first value and increase the regulating current when the feedback voltage drops below a second value smaller than the first value.

11. The LED lighting device of claim 8, further comprising:
  an internal regulator configured to generate power for at least one of the voltage sensing circuit and the constant current controller from the first pin.

12. The LED lighting device of claim 8, further comprising:
  a power supply circuit for providing the rectified AC voltage; and
  an internal regulator coupled to a fourth pin of the first current regulator and configured to generate power for at least one of the voltage sensing circuit and the constant current controller from the fourth pin, wherein the fourth pin is coupled to the power supply circuit.

13. The LED lighting device of claim 1, wherein the charge storage unit is further configured to stop supplying the first current and start to be charged by the rectified AC voltage when the rectified AC voltage becomes larger than the first voltage.

14. An LED lighting device, comprising:
  a luminescent device having a first end and a second end, and configured to provide light according to first current;
  a current control unit comprising:
    a first current regulator having a first pin coupled to receive a rectified AC voltage and a second pin coupled to the first end of the luminescent device, and configured to:
      regulate the first current so that the first current does not exceed a first current setting; and
      adjust a value of the first setting according to a voltage of the first pin; and
    a second current regulator having a first end coupled to the second end of the luminescent device and configured to regulate second current so that the second current does not exceed a second current setting, wherein the second current is an overall current of the LED lighting device; and
  a charge storage unit having a first end coupled to the first pin of the first current regulator and a second end coupled to the second end of the luminescent device, and configured to supply the first current when the rectified AC voltage is smaller than a first voltage established across the charge storage unit, thereby keeping the luminescent device turned on.

15. The LED lighting device of claim 14, wherein the first current regulator includes:
- a transistor configured to generate regulating current associated with the first current setting for the luminescent device according to a first control signal;
- a current sensing element configured to sense a level of the regulating current, thereby providing a corresponding feedback voltage;
- a voltage sensing circuit coupled to the first pin of the first current regulator and configured to detect the voltage of the first pin, thereby outputting a corresponding second control signal; and
- a constant current controller configured to adjust a level of the first control signal according to the second control signal and the feedback voltage.

16. The LED lighting device of claim 15, wherein the transistor is configured to increase the regulating current when the voltage of the first pin exceeds a first level and reduce the regulating current when the voltage of the first pin drops below a second level lower than the first level.

17. The LED lighting device of claim 15, wherein the transistor is configured to reduce the regulating current when the feedback voltage exceeds a first value and increase the regulating current when the feedback voltage drops below a second value smaller than the first value.

18. The LED lighting device of claim 15, further comprising:
- an internal regulator configured to generate power for at least one of the voltage sensing circuit and the constant current controller from the first pin.

19. The LED lighting device of claim 14, further comprising:
- a current sensing element coupled between the second pin and a third pin of the first current regulator, and configured to sense a level of regulating current associated with the first current setting, thereby providing a corresponding feedback voltage.

20. The LED lighting device of claim 19, wherein the first current regulator includes:
- a transistor configured to generate the regulating current for the luminescent device according to a first control signal;
- a voltage sensing circuit coupled to the first pin and configured to detect the voltage of the first pin, thereby outputting a corresponding second control signal; and
- a constant current controller configured to adjust a level of the first control signal according to the second control signal and the feedback voltage.

21. The LED lighting device of claim 20, wherein the transistor is configured to increase the regulating current when the voltage of the first pin exceeds a first level and reduce the regulating current when the voltage of the first pin drops below a second level lower than the first level.

22. The LED lighting device of claim 20, wherein the transistor is configured to reduce the regulating current when the feedback voltage exceeds a first value and increase the regulating current when the feedback voltage drops below a second value smaller than the first value.

23. The LED lighting device of claim 20, further comprising:
- an internal regulator configured to generate power for at least one of the voltage sensing circuit and the constant current controller from the first pin.

24. The LED lighting device of claim 14, wherein the charge storage unit is further configured to stop supplying the first current and start to be charged by the rectified AC voltage when the rectified AC voltage becomes larger than the first voltage.

* * * * *